US010427769B1

(12) United States Patent
Garrett

(10) Patent No.: US 10,427,769 B1
(45) Date of Patent: Oct. 1, 2019

(54) SYSTEM OF BRACKETS AND RAILS FOR ATTACHING WHEELS, TOWING, AND ACCESSORY DEVICES TO SMALL PONTOON WATERCRAFT

(71) Applicant: Patrick D. Garrett, Spicewood, TX (US)

(72) Inventor: Patrick D. Garrett, Spicewood, TX (US)

( * ) Notice: Subject to any disclaimer, the term of this patent is extended or adjusted under 35 U.S.C. 154(b) by 337 days.

(21) Appl. No.: 15/394,570

(22) Filed: Dec. 29, 2016

(51) Int. Cl.
| | |
|---|---|
| *B63C 13/00* | (2006.01) |
| *B60P 3/10* | (2006.01) |
| *B62B 1/12* | (2006.01) |
| *B62K 27/00* | (2006.01) |
| *B62H 3/02* | (2006.01) |
| *B63B 35/38* | (2006.01) |
| *B63B 25/00* | (2006.01) |
| *B63H 20/06* | (2006.01) |
| *B63H 20/00* | (2006.01) |
| *B63H 16/20* | (2006.01) |

(52) U.S. Cl.
CPC .............. *B63C 13/00* (2013.01); *B60P 3/105* (2013.01); *B62B 1/12* (2013.01); *B62H 3/02* (2013.01); *B62K 27/003* (2013.01); *B63B 25/00* (2013.01); *B63B 35/38* (2013.01); *B63H 20/007* (2013.01); *B63H 20/06* (2013.01); *B63H 2016/202* (2013.01)

(58) Field of Classification Search
CPC .................................. B63C 13/00; B62B 1/12
See application file for complete search history.

(56) References Cited

U.S. PATENT DOCUMENTS

| | | | | |
|---|---|---|---|---|
| 1,109,520 | A | | 9/1914 | Flower |
| 2,042,598 | A | | 6/1936 | Harvey |
| 3,210,783 | A | * | 10/1965 | Petty ....................... B63B 1/121 114/344 |
| 3,301,571 | A | * | 1/1967 | Malcolm ............... B62B 5/0083 280/47.32 |
| 3,370,309 | A | * | 2/1968 | Fredelake ............. B60F 3/0092 114/344 |
| 3,879,781 | A | * | 4/1975 | Roschynialski ........ B63C 13/00 114/344 |
| 3,986,723 | A | | 10/1976 | Brockelsby |
| 4,243,239 | A | | 1/1981 | Whitney |
| 4,318,196 | A | | 3/1982 | Eide |
| 4,615,534 | A | | 10/1986 | Blain |
| 4,807,894 | A | * | 2/1989 | Walker ................. B62D 63/061 280/63 |
| 4,824,127 | A | | 4/1989 | Stamm |
| 5,011,441 | A | * | 4/1991 | Foley ..................... B63H 16/14 114/61.1 |
| 5,086,721 | A | * | 2/1992 | Burkard ................. B63B 1/121 114/363 |
| 5,207,441 | A | | 5/1993 | Granbery |

(Continued)

*Primary Examiner* — S. Joseph Morano
*Assistant Examiner* — Jovon E Hayes

(57) ABSTRACT

A system of brackets and rails for attaching wheels, towing devices, and other accessories to small pontoon watercraft in various locations and combinations to increase the transportability and utility of the watercraft. Among the advantages are the ability to tow the watercraft by hand or bicycle, and to allow other devices such as a human powered pedal drive, trolling motor, bike rack, cargo rack, and other accessories to be attached easily and without the use of tools.

4 Claims, 9 Drawing Sheets

(56) References Cited

U.S. PATENT DOCUMENTS

| | | | |
|---|---|---|---|
| 5,320,371 | A | 6/1994 | Levad |
| 5,348,327 | A | 9/1994 | Gieske |
| 5,425,326 | A | 6/1995 | Tibbedeaux |
| 5,573,259 | A | 11/1996 | Castillo |
| 5,651,706 | A * | 7/1997 | Kasper ............... B63B 7/082 114/354 |
| 5,711,240 | A * | 1/1998 | Baker ............... B63B 7/082 114/345 |
| 5,803,774 | A * | 9/1998 | White ............... B63H 21/175 114/61.12 |
| 5,870,966 | A * | 2/1999 | Christian ............... B63B 7/04 114/283 |
| 5,878,688 | A * | 3/1999 | Merrett ............... B63B 7/082 114/345 |
| 6,032,964 | A | 3/2000 | Capobianco |
| 6,095,079 | A * | 8/2000 | Smidt ............... B63B 1/12 114/353 |
| 6,146,218 | A * | 11/2000 | White ............... B63B 7/082 114/61.15 |
| 6,439,145 | B1 * | 8/2002 | Mensch ............... B63C 13/00 114/344 |
| 6,446,570 | B1 * | 9/2002 | Johnson ............... B63C 13/00 114/344 |
| 6,564,735 | B1 * | 5/2003 | Jackson ............... B63B 35/36 114/353 |
| 6,640,741 | B1 * | 11/2003 | Myers ............... B63B 1/121 114/352 |
| 7,096,817 | B1 * | 8/2006 | Scadden ............... B63B 1/121 114/363 |
| 9,409,627 | B2 * | 8/2016 | Fulop ............... B63B 7/02 |
| 10,112,690 | B1 * | 10/2018 | Garrett ............... B63C 13/00 |
| 2005/0217555 | A1 * | 10/2005 | Otobe ............... B63B 7/087 114/343 |
| 2006/0186635 | A1 | 8/2006 | Stewart |
| 2011/0247538 | A1 * | 10/2011 | Gimpel ............... B60P 3/1033 114/61.1 |

* cited by examiner

SYSTEM OF BRACKETS AND RAILS FOR ATTACHING WHEELS, TOWING, AND ACCESSORY DEVICES TO SMALL PONTOON WATERCRAFT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates to the attachment of wheels, towing, and accessory devices to small pontoon watercraft having an interconnecting boat frame structure with multiple transverse and longitudinally oriented frame members between spaced apart pontoons, to increase the transportability and utility of the watercraft.

Small pontoon watercraft, such as inflatable pontoon fishing boats, are plentiful, lightweight, economical, and very practical for the recreational user. They are used on a variety of waterways including: lakes, streams, rivers, and oceans, and though they are relatively light, they are bulky and not easily carried by one person, especially with the addition of any gear, equipment and supplies. Therefore, they are usually conveyed to the water's edge by automobile or the combination of automobile and trailer.

Transportation of small watercraft to the water by automobile is burdensome for a number of reasons, such as: preparation of the vehicle and the watercraft for transport, water access by the vehicle, terrain, available parking, and distance to the water. First, to convey to the water by automobile, the vehicle as well as the boat, gear, equipment and supplies must be readied, loaded into or onto a vehicle, and secured for transport. This may require added equipment and reconfiguration of the vehicle and possibly even some disassembly of the watercraft to make it ready for travel. Second, the desired water entry point must be accessible by the vehicle. Third, there must be parking at the water's edge at the exact point of entry, or the boat, gear, equipment and supplies will have to be dropped at the water's edge and the vehicle moved to a suitable parking location. In such a case, the driver would have to leave the boat and gear unattended by the water's edge and walk back to the boat from the vehicle after it is parked.

Similarly, conveying small watercraft by combination of automobile and trailer is even more burdensome and likely more expensive than with just an automobile, as it requires additional cost, time and effort to acquire the trailer, store it, maintain it, and retrieve it for the same purpose and with the same burdens listed above for transporting by automobile.

Conventional transportation with automobile and trailer seems very impractical for such small watercraft, especially when the distance to the water is very short. The nature of small boats implies an economy of not only price and size, but also economy of time and effort. It seems reasonable to expect a proportional amount of effort relative to the size of the boat and the distance to the water. Reasonableness suggests that if the trip itself, either by walking or by bicycle, is shorter than the time it would take to load, transport by automobile, and then unload the watercraft at the water's edge, then a portage solution by pedestrian or bicycle should be available, allowing quicker and easier access to the water without the use of a vehicle.

The notion of economy of time and effort relative to the distance from the water is particularly evident when small boat owners live, vacation or camp near the water. For example, many small boat owners live in communities near the water and merely desire to transport their craft a very short distance across their property, down the street, or through the neighborhood. Or a camper may only have need to move their watercraft a short distance from the camp site to the water, but readying the watercraft and vehicle for a short trip could take as much time and effort as a very long trip. Such short trips make the time spent readying the watercraft for transport disproportionately inconvenient and troublesome compared to the actual short trip itself. Even the trip from a truck or trailer parked near the water, often a matter of just a few feet, can be just as big of a challenge as if it were much longer, as it is not desirable to drag the watercraft over land for any distance at all, especially if the craft is inflatable and the terrain is treacherous.

Prior art reveals a variety of efforts to try to improve the ease and efficiency of transporting small watercraft by pedestrian or bicycle over land by attaching wheels and towing attachments to various types of small watercraft, including: canoes, kayaks, surfboards, sailboards, amphibious watercycles, small monohull boats, and small pontoon boats.

U.S. Pat. No. 4,243,239, issued to Whitney (1981), reveals a dolly for a catamaran held in place under the catamaran hulls by a flexible line attached to the watercraft for hand towing by pedestrian. This system does not appear to offer a sturdy and reliable connection, especially when changing direction, nor does it have a solution for connecting to a bicycle. U.S. Pat. No. 5,207,441, issued to Granbery (1993), shows a sailboard towing device attachable to a bicycle using the sailboard and mast as part of the trailer device assembled with a wheel system coupled to it in a dolly fashion. This apparatus is specifically tailored to watercraft of similar design with a mast and monohull to be used as part of the trailering system. U.S. Pat. No. 5,573,259, issued to Castillo (1996), demonstrates a narrow, single wheel trailer apparatus pulled behind a bicycle. U.S. Pat. No. 5,803,774, issued to White (1998), displays a traileable amphibious bicycle with retractable wheels that is powered and trailered by the same bicycle. U.S. Pat. No. 6,095,079, issued to Smidt (2000), discloses a folding pontoon boat with removably attachable wheels on either side for portage by hand. U.S. Pat. No. 6,446,570 B1, issued to Johnson (2002), describes an attachable portage apparatus for a lightweight pontoon watercraft having a central frame, where a single removable wheel is attached to a central strut mounted to the central frame of the watercraft and is maneuvered over land by hand in wheelbarrow fashion. Johnson teaches away from attaching multiple wheels citing the single wheel design as an advantage to movement over uneven ground. Similarly, U.S. Pat. No. 7,096,817 B1, issued to Scadden (2006), exhibits a pontoon float boat with a single removable wheel fixed to a receiver on the platform structure between the floats for movement of the craft over land, also in a wheelbarrow fashion. While Johnson and Scadden have similar removably attached single wheel assemblies, Johnson uses a removably attached central strut mounted to the boat frame, while Scadden permanently mounts a single receiver to the boat platform structure intermediate between the floats. Neither would offer the balance of a multiwheel system.

In conclusion, in so far as I am aware, no apparatus or system formerly developed allows for the attachment of multiple devices, simultaneously, in various locations and configurations to small pontoon watercraft.

ADVANTAGES

Accordingly several advantages of one or more aspects are as follows: a system of brackets and rails for attaching wheels, towing devices, and other accessories to small pontoon watercraft in a variety of locations and combinations. Among the advantages are a light weight and economical system of brackets and rails with at least one embodiment having slip-on, removably attachable brackets requiring no tools to mount or remove. The brackets and rails use the existing frame structure of the watercraft as the fundamental trailering and mounting structure, so no additional trailer is needed and additional attachments require little material. It allows towing by hand, bicycle, or other small vehicle, as well as attachment of single and multiple wheels as desired, and easily allows movement by one person of watercraft, gear and additional supplies over land. The collection of brackets and rails provides faster access to the water than driving when the distance is relatively short and walking or biking is faster than loading the watercraft into a vehicle or on a trailer for transport to the water. A variety of accessories are easily mounted to the brackets and rails, such as a front mounted trolling motor where the controls can be reached easily, a human powered pedal drive, or a bike rack for taking the bicycle with the watercraft to make it amphibious, allowing the craft to become more useful, fun, and convenient to use. With the use of a few simple brackets and rails, the watercraft becomes more environmentally friendly without the use of an automobile, and can more easily reach the water for launching and retrieval of the craft directly at the water. The simple brackets and rails allow selective positioning of the wheel posts inside of the brackets, permitting the height of the watercraft to be adjusted over land, or the height of the wheels to be raised in a stowed position over water. The orientation of the brackets on the rails can also be changed to easily rotate the wheel post or other devices on the end of the rail, instead of sliding thru the bracket, as desired. The combination of brackets and rails on transverse round frame members provides an easy, economical and reliable non-twisting connection on round frame members, and the brackets and rails can be easily produced to fit any size tube or length of rail as needed to fit any small pontoon boat frame. The brackets can also be easily produced in different types to be removably slip-on, bolt-on, or permanent weld-on, as desired and to adapt to a variety of embodiments and timing in the manufacturing process, or as an aftermarket add-on.

Other advantages of one or more aspects will become apparent from a consideration of the drawings and ensuing description.

SUMMARY

In accordance with one embodiment, a system of brackets and rails for attaching a variety of devices in multiple configurations to small pontoon watercraft for the attachment of wheels, towing devices, and other accessories to increase the transportability and utility of the craft.

Figure 1:
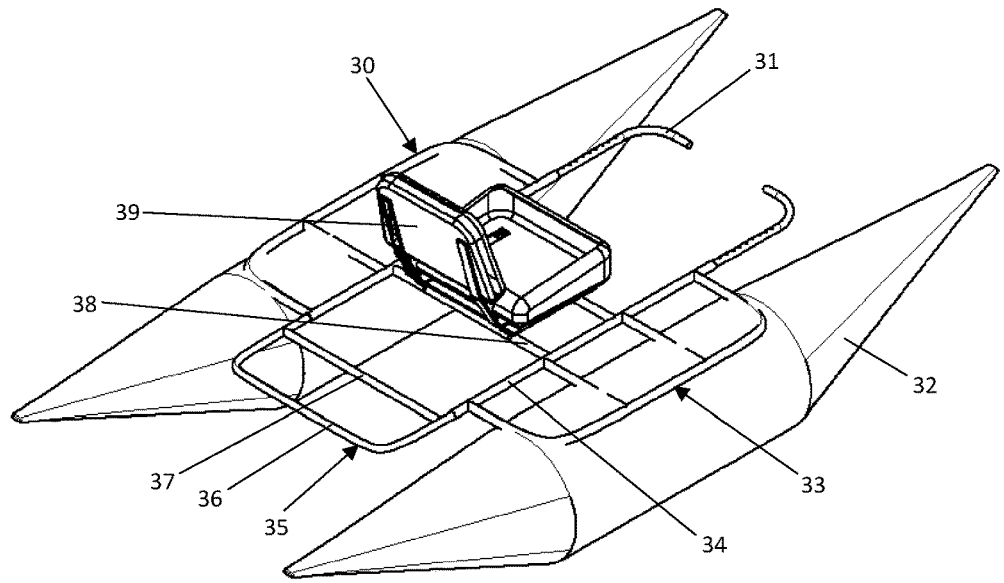
FIG. 1 is an upper right rear perspective view of a pontoon watercraft.

| REFERENCE NUMERALS | | | |
|---|---|---|---|
| 30 | Pontoon Watercraft | 31 | Foot Rest Tubes |
| 32 | Pontoon | 33 | Pontoon Frame |
| 34 | Boat Frame Main Tube | 35 | Gear Rack |
| 36 | Gear Rack Main Tube | 37 | Gear Rack Cross Bar |
| 38 | Boat Seat Frame | 39 | Boat Seat |
| 40 | U-Bracket | 41 | Hole |
| 42 | Hand Knob Threaded Rod | 43 | T-Bracket |
| 44 | Cross Bracket | 45 | Seatpost Bracket |
| 46 | Swing Bracket | 47 | Accessory Bracket |
| 48 | Trolling Motor Mounting Pad | 49 | Tow Bar Slot |
| 50 | Accessory Mounting Slot | 51 | Square Receiver Tube |
| 52 | Round Receiver Tube | 53 | Channel Bracket |
| 54 | Boat Wheel Assembly | 55 | Wheel Post |
| 56 | Boat Wheel | 57 | Nut |
| 58 | Bolt | 59 | Stabilizing Rail |
| 60 | Pin | 61 | Pedestrian |
| 62 | Outrigger Rail | 63 | Cross Rail |
| 64 | Seatpost Tow Bar | 65 | Bicycle |
| 66 | Bicycle Seat | 67 | Seatpost |
| 68 | Bicycle Wheel | 69 | Rear Axle Tow Bar |
| 70 | Rear Bicycle Axle | 71 | Bike Rack |

-continued

REFERENCE NUMERALS

| 72 | Bike Rack Main Tube Legs | 73 | Bike Rack Arm |
| 74 | Bike Rack Mounting Rail | 75 | Trolling Motor |
| 76 | Lift Tube | 77 | Human Powered Pedal Drive |

DETAILED DESCRIPTION

One embodiment of a system of brackets and rails for attaching wheels, towing, and accessory devices to small pontoon watercraft is illustrated as follows.

FIG. 1 illustrates an upper right rear perspective view of a pontoon watercraft 30, having two spaced apart pontoon frames 33 removably coupled to two spaced apart pontoons 32, with interconnecting transverse and longitudinally oriented frame members comprising a boat seat frame 38 supporting boat seat 39, removably coupled to boat frame main tubes 34, and a gear rack 35 having a gear rack cross bar 37 and gear rack main tube 36, inserted and removably coupled to the aft end of boat frame main tubes 34, and foot rest tubes 31 inserted and removably coupled to the fore end of boat frame main tubes 34.

Figure 2:
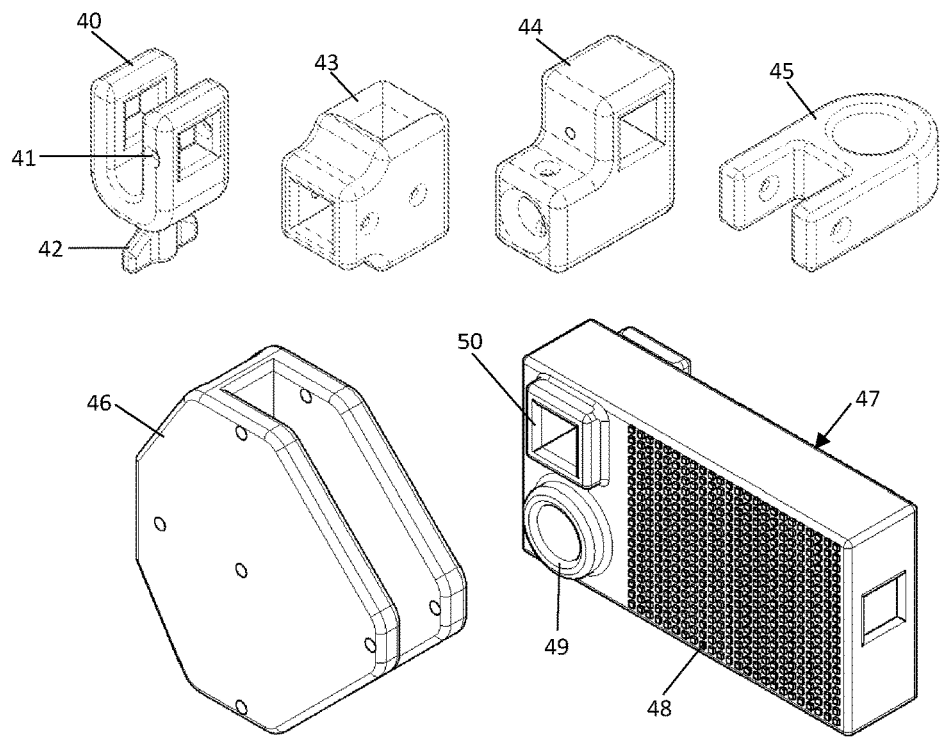
FIG. 2 is a perspective view of one embodiment of six slip-on brackets.

FIG. 2 illustrates a perspective view of one embodiment of six slip-on brackets: a U-bracket 40 having a slot cut through the two legs orthogonal to the U-shaped opening, a hole 41 through one of the legs, and a hand knob threaded rod 42 inserted into a threaded hole from the outside at the apex of the bend centered in the back of the bracket; a T-bracket 43 having a thru-slot and an intersecting slot terminating at the thru-slot with holes centered perpendicular to each slot; a cross bracket 44 having two non-intersecting orthogonally oriented thru-slots with holes centered perpendicularly through each thru-slot; a seatpost bracket 45 having a ring with two tangent parallel ears projecting from the edges of the ring, with a space in between the ears, and a hole centered through the ears; a swing bracket 46 of substantially a U-shape, with a terminating slot in the middle of the closed end of the bracket and concentric holes along the edges of the open end; an accessory bracket 47 providing a trolling motor mounting pad 48, a tow bar slot 49, and an accessory mounting slot 50.

Figure 3:
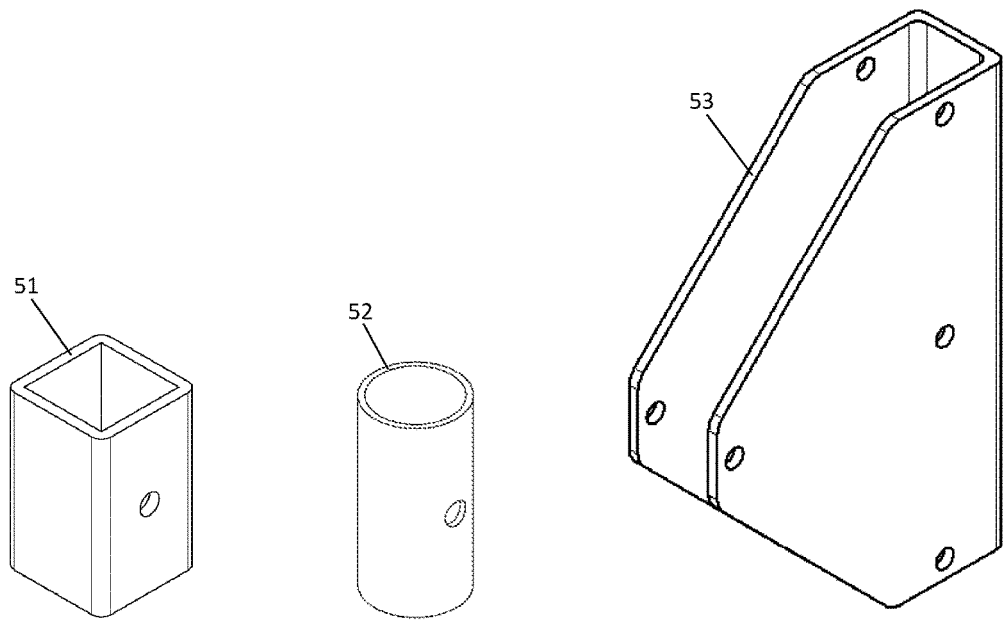
FIG. 3 is perspective view of one embodiment of three weld-on brackets.

FIG. 3 illustrates a perspective view of one embodiment of three weld-on brackets: a square receiver tube 51, a round receiver tube 52, and a channel bracket 53, each with holes for securing attachments.

Figure 4:
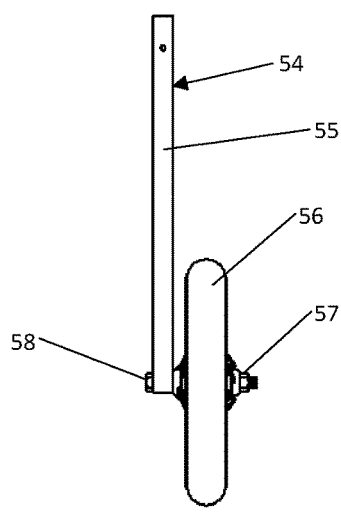
FIG. 4 is an end view of a boat wheel assembly.

FIG. 4 illustrates an end view of a boat wheel assembly 54, having wheel post 55 connected to boat wheel 56 by bolt 58 and nut 57.

Figure 5:
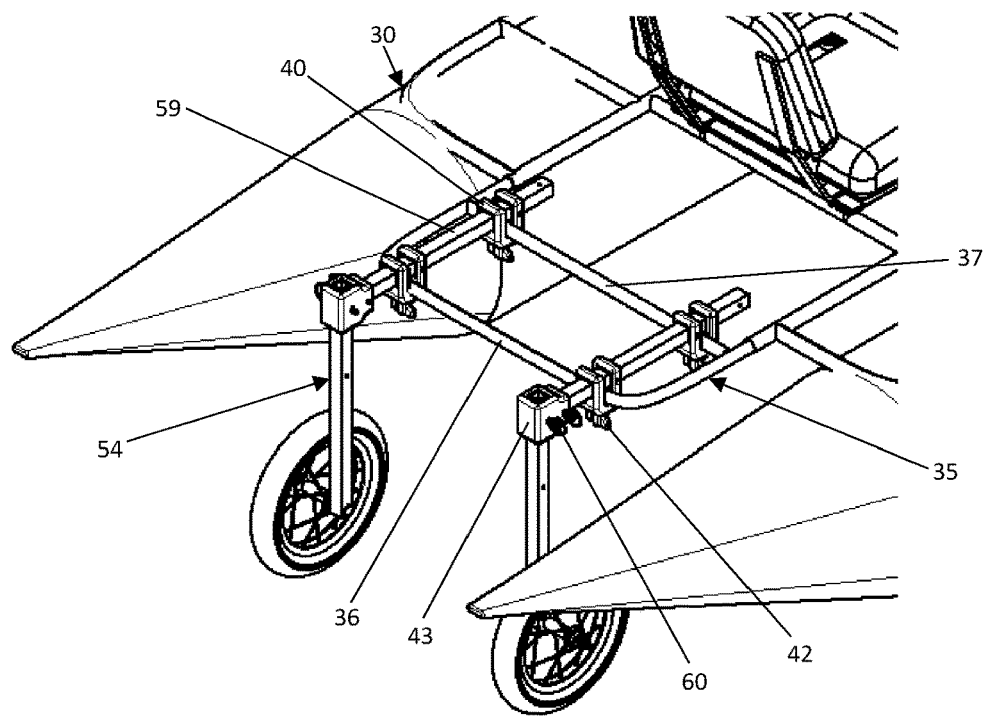
FIG. 5 is an upper right rear perspective view of a pontoon watercraft with wheels attached to the gear rack.

FIG. 5 illustrates an upper right rear perspective view of a pontoon watercraft 30 with boat wheel assemblies 54 connected to T-brackets 43 with pins 60 and attached to stabilizing rails 59 coupled to gear rack 35 by the gear rack main tube 36 and a gear rack cross bar 37 with U-brackets 40 and hand knob threaded rods 42.

Figure 6:
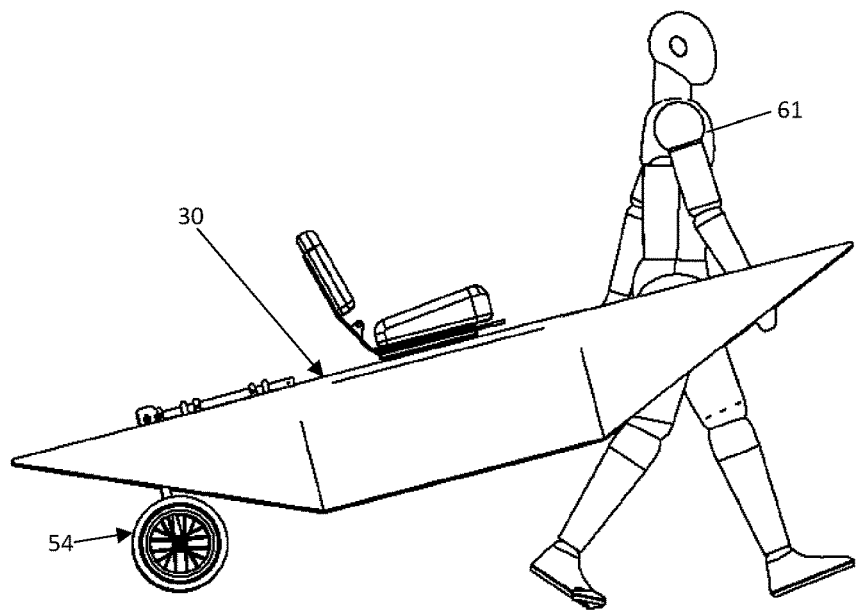
FIG. 6 is a right side view of a pontoon watercraft with wheels being towed by a pedestrian.

FIG. 6 illustrates a right side view of a pontoon watercraft 30 with boat wheel assemblies 54 in tow by a pedestrian 61.

Figure 7:
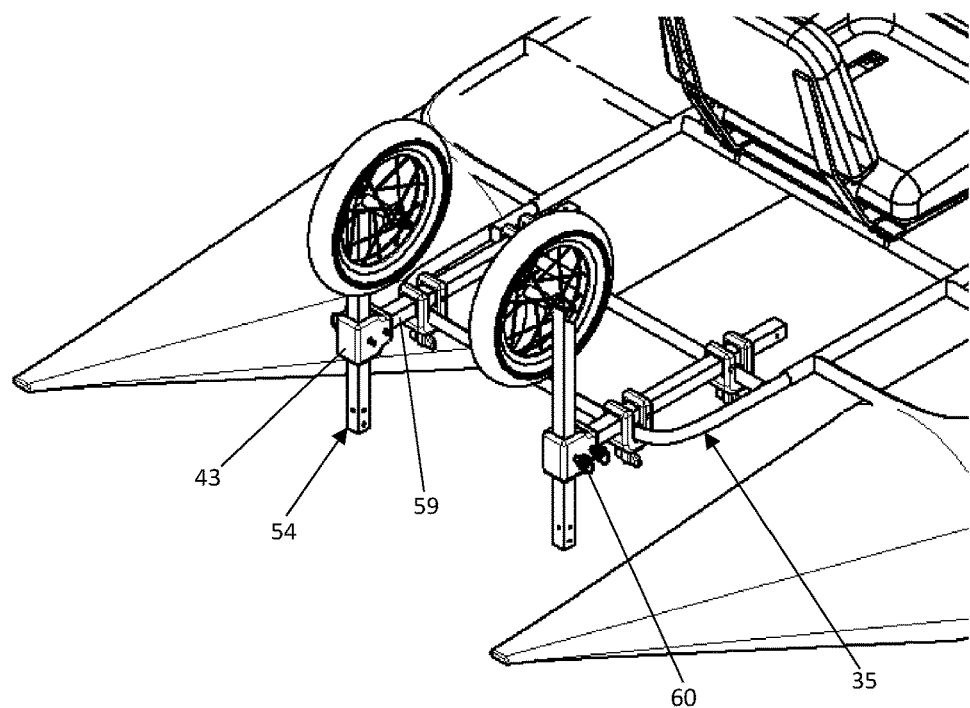
FIG. 7 is an upper right rear perspective view of a pontoon watercraft with wheels attached to the gear rack in an upright stowed position.

FIG. 7 illustrates an upper right rear perspective view of boat wheel assemblies 54 inserted in T-brackets 43 from the top and attached to stabilizing rails 59 with pins 60 to gear rack 35.

Figure 8:
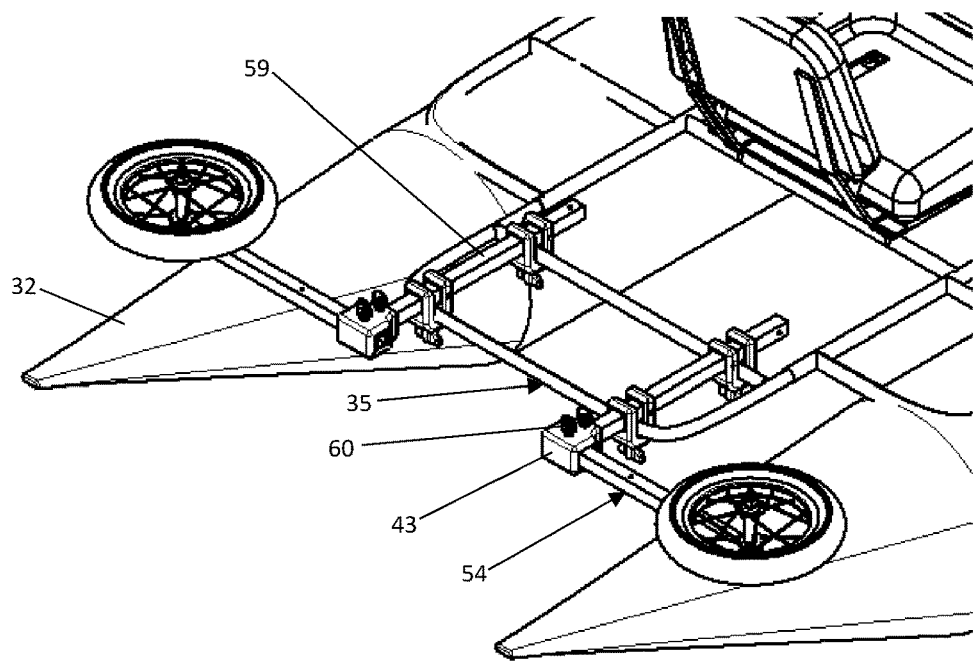
FIG. 8 is an upper right rear perspective view of a pontoon watercraft with wheels attached to the gear rack in a sideways stowed position.

FIG. 8 illustrates an upper right rear perspective view of boat wheel assemblies 54 inserted in T-brackets 43 from the side, resting on or above pontoons 32, and attached to stabilizing rails 59 with pins 60 to gear rack 35.

Figure 9:
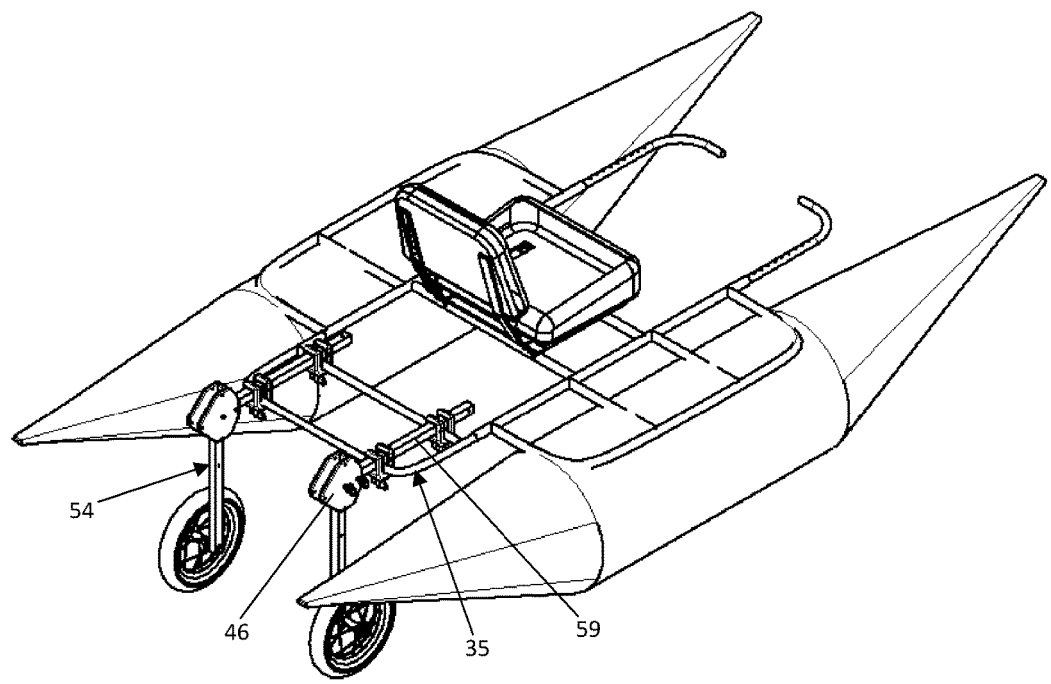
FIG. 9 is an upper right rear perspective view of a pontoon watercraft with wheels attached to the gear rack with swing brackets.

FIG. 9 illustrates an upper right rear perspective view of boat wheel assemblies 54 coupled to swing brackets 46 attached to stabilizing rails 59 to gear rack 35.

Figure 10:
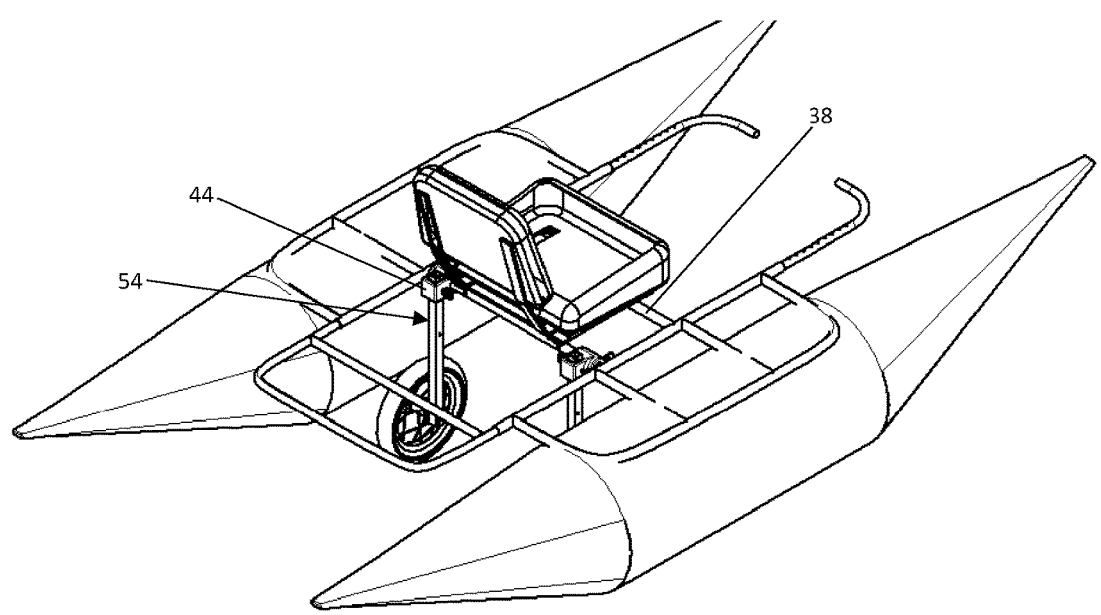
FIG. 10 is an upper right rear perspective view of a pontoon watercraft with wheels attached to the boat seat frame.

FIG. 10 illustrates an upper right rear perspective view of boat wheel assemblies 54 coupled to cross brackets 44 attached to boat seat frame 38.

Figure 11:
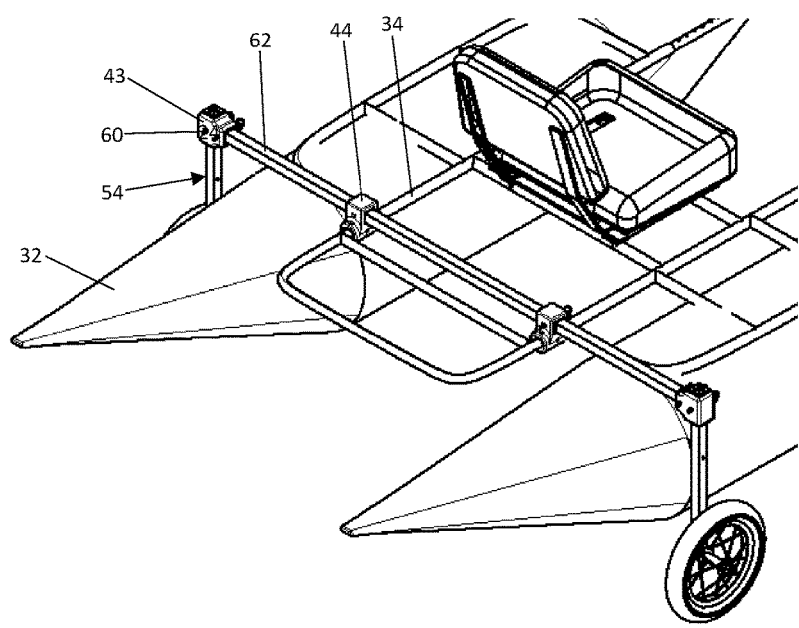
FIG. 11 is an upper right rear perspective view of a pontoon watercraft with wheels attached to the outrigger rail.

FIG. 11 illustrates an upper right rear perspective view of outrigger rail 62 coupled to boat frame main tubes 34 by cross brackets 44, with boat wheel assemblies 54 attached to the ends of outrigger rail 62 on the outside of pontoons 32 by T-brackets 43 held in place by pins 60.

Figure 12:
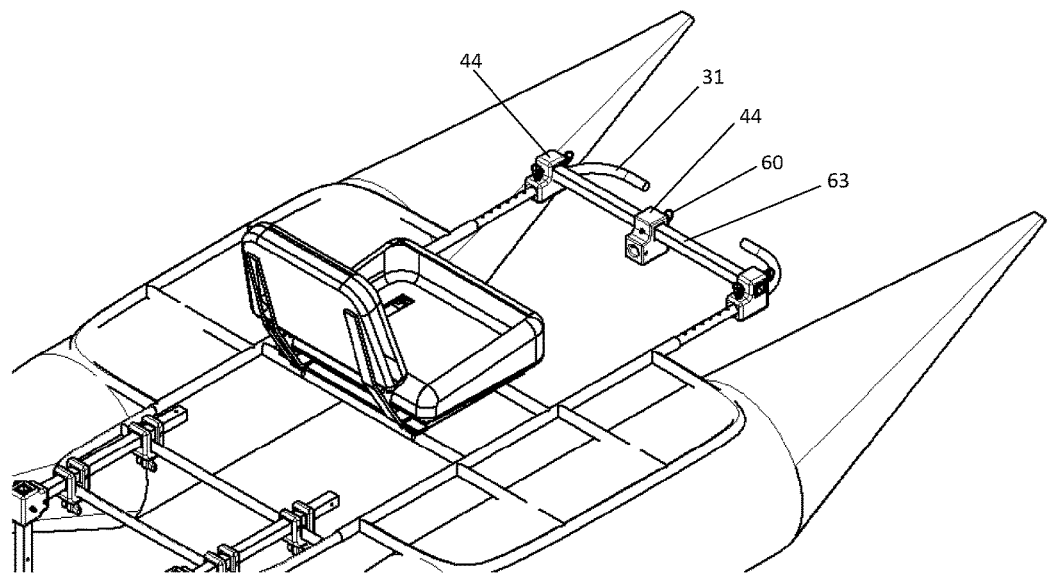
FIG. 12 is an upper right rear perspective view of a pontoon watercraft showing a cross rail attached to the foot rests.

FIG. 12 illustrates an upper right rear perspective view of cross rail 63 coupled to foot rest tubes 31 with cross brackets 44, secured in place by pins 60, having another cross bracket 44 centered between foot rest tubes 31, also secured in place with pin 60.

Figure 13:
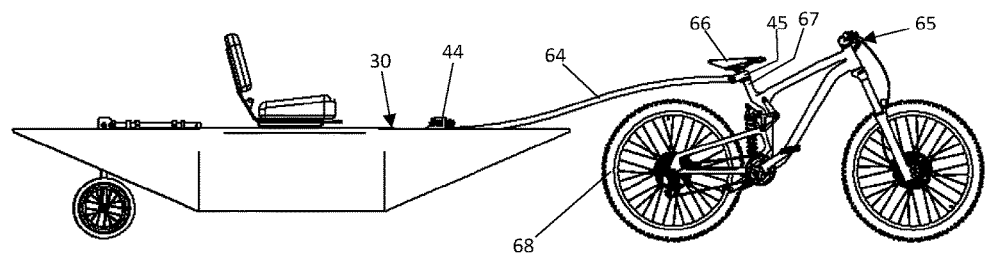
FIG. 13 is a right side view of a pontoon watercraft connected to the seatpost of a bicycle for towing.

FIG. 13 illustrates a right side view of pontoon watercraft 30 connected to bicycle 65 by seatpost tow bar 64 rotationally attached on one end to cross bracket 44 and on the other end to seatpost bracket 45 coupled to seatpost 67 below bicycle seat 66.

Figure 14:
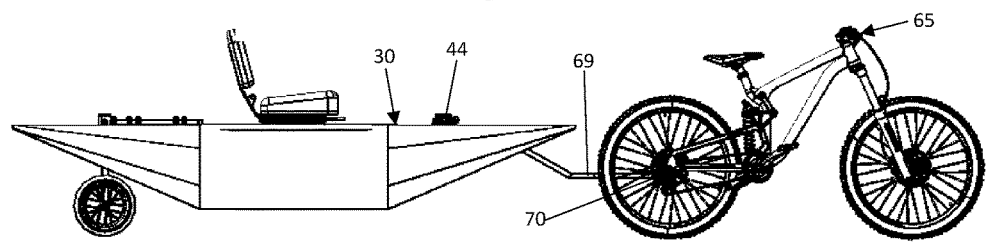
FIG. 14 is a right side view of a pontoon watercraft connected to the rear axle of a bicycle for towing.

FIG. 14 illustrates a right side view of pontoon watercraft 30 connected to bicycle 65 by rear axle tow bar 69 rotationally attached on one end to cross bracket 44 and on the other end to rear bicycle axle 70.

Figure 15:
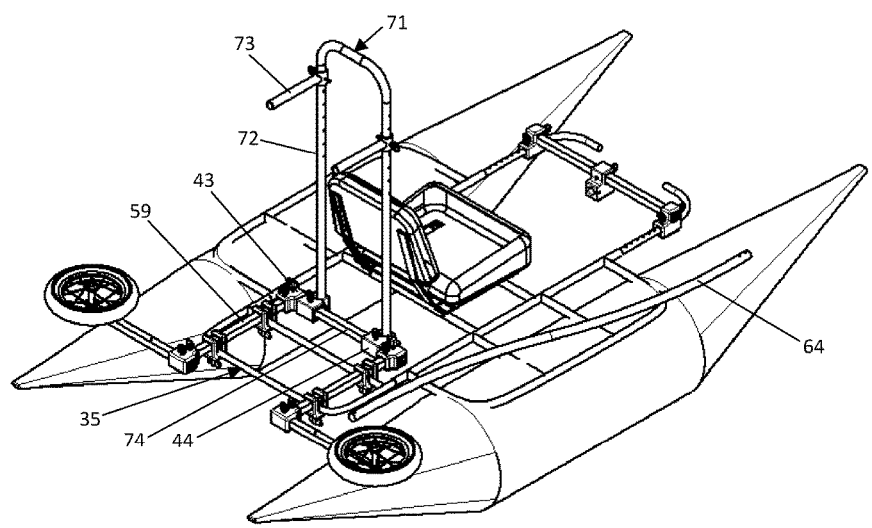
FIG. 15 is an upper right rear perspective view of a pontoon watercraft with wheels, a bike rack, and a cross rail.

FIG. 15 illustrates an upper right rear perspective view showing bike rack 71 with adjustably positionable bike rack arms 73, with bike rack main tube legs 72 inserted into cross brackets 44, attached to bike rack mounting rail 74 held to stabilizing rails 59 with T-brackets 43 on gear rack 35, showing seatpost tow bar 64 stowed on board.

Figure 16:
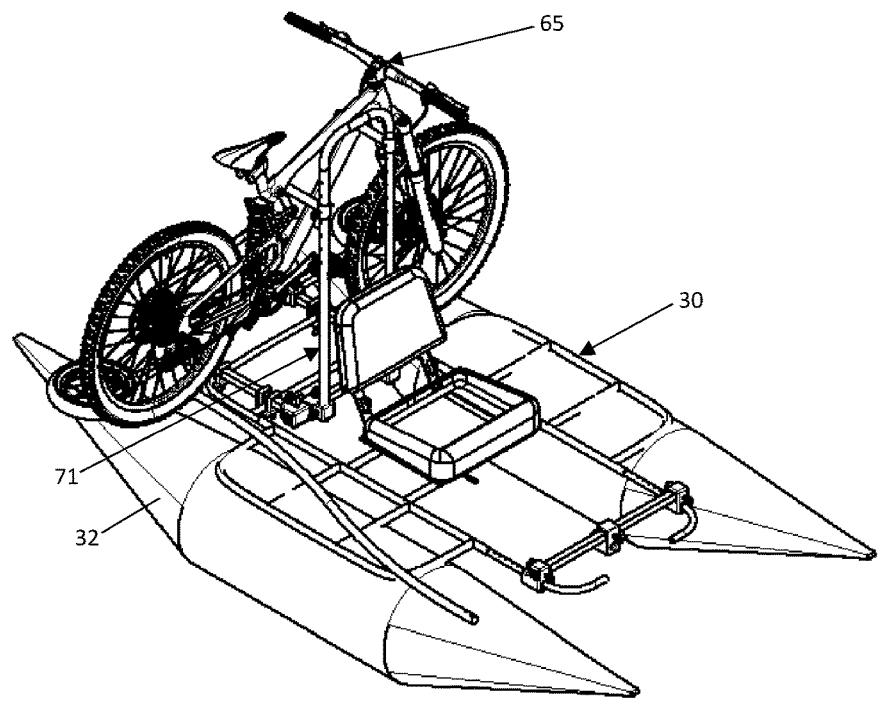
FIG. 16 is an upper right front perspective view of a pontoon watercraft with wheels, a bicycle mounted on the bike rack, and a cross rail.

FIG. 16 illustrates an upper right front perspective view of pontoon watercraft 30 with bicycle 65 attached to bike rack 71 above pontoons 32.

Figure 17:
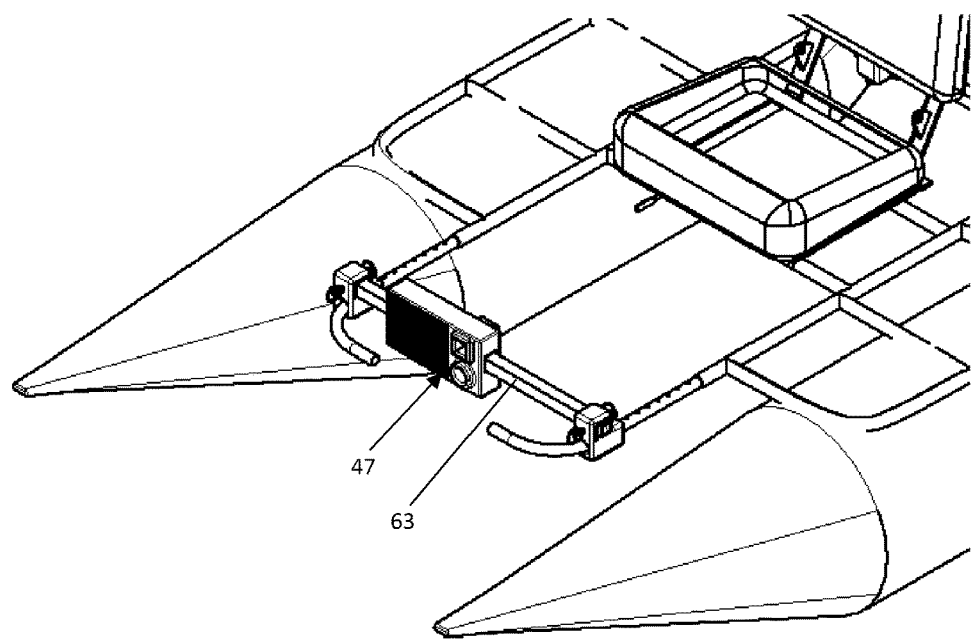
FIG. 17 is an upper left front perspective view of a pontoon watercraft with an accessory bracket mounted to a cross rail.

FIG. 17 illustrates an upper left front perspective view showing accessory bracket 47 attached to cross rail 63.

Figure 18:
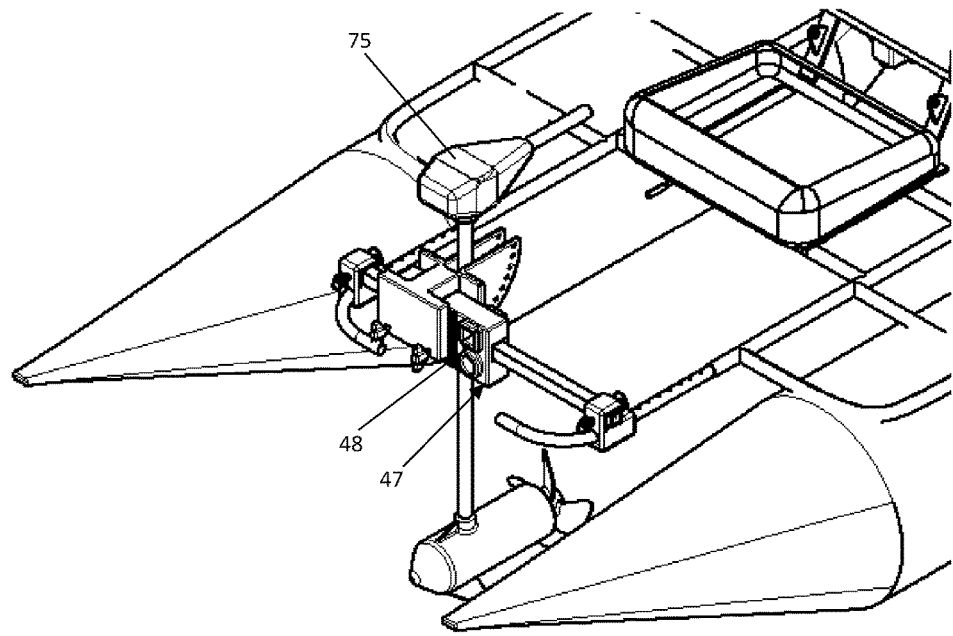
FIG. 18 is an upper left front perspective view of a pontoon watercraft with a trolling motor mounted to an accessory bracket.

FIG. 18 illustrates an upper left front perspective view showing trolling motor 75 attached to the trolling motor mounting pad 48 of accessory bracket 47.

Figure 19:
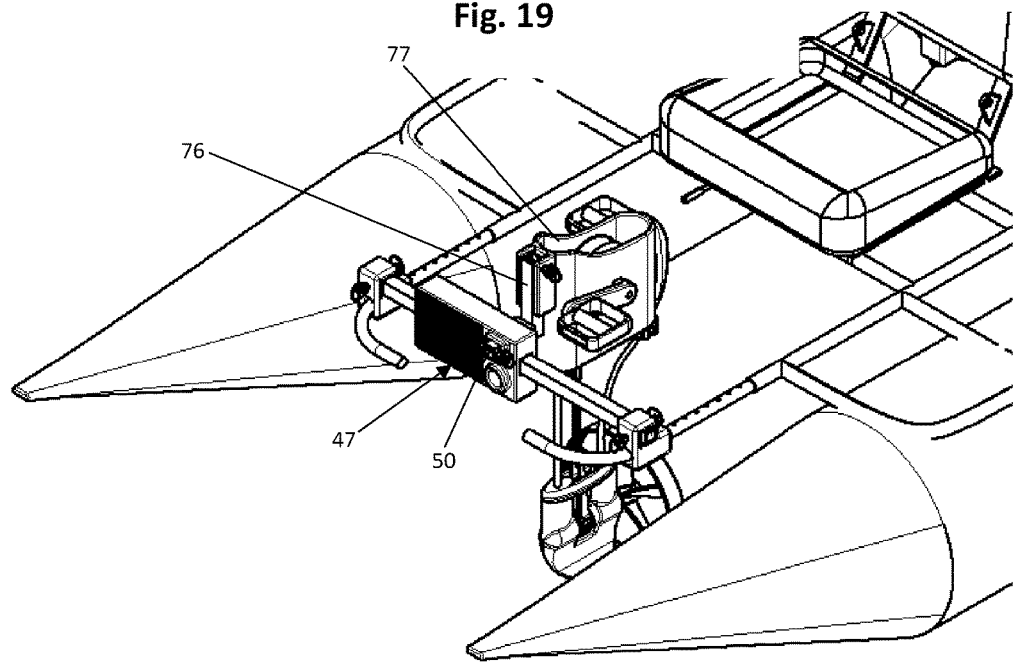
FIG. 19 is an upper left front perspective view of a pontoon watercraft with a human powered pedal drive mounted to an accessory bracket.

FIG. 19 illustrates an upper left front perspective view showing human powered pedal drive 77 coupled to lift tube 76 inserted into accessory mounting slot 50 of accessory bracket 47.

Operation—Attachment of Wheels to Gear Rack for Pedestrian Towing—FIGS. 5 & 6

To attach a single or multiple system of brackets and rails to a small pontoon watercraft having an interconnecting boat frame structure with multiple transverse and longitudinally oriented frame members between spaced apart pontoons, to increase the transportability and utility of the watercraft: slide a pair of U-brackets 40, one each over a pair of parallel spaced apart transverse frame members, such as a gear rack main tube 36 and a gear rack cross bar 37 in significant alignment with each other from fore to aft, then slide a stabilizing rail 59 through the two U-brackets 40 and tighten together by compression with hand knob threaded rod 42 to hold securely in place. Then couple a T-bracket 43 on the end of each stabilizing rail 59 in a selected orientation as desired and secure each in place with pin 60. Next, slide a wheel assembly into each T-bracket and pin in place with pin 60. Pedestrian 61 can now lift the front end of pontoon watercraft 30 and tow by hand in either direction as desired.

Operation—Alternative Wheel Orientations with T-Brackets—FIGS. 4, 7 & 8

A variety of wheel orientations can be achieved from selectively rotating the T-brackets 43 on the end of the stabilizing rail 59 to orient boat wheel assemblies 54 in either an up, side or down position as desired either for towing the watercraft on land or stowing the wheels in position for water travel or storage. The wheel posts 55 can also be selectively positioned into the T-brackets 43 in terms of rotational orientation, depth they are recessed into the T-brackets 43, or by what direction they are inserted from, to obtain an even greater variety of orientations for towing or stowage.

Operation—Wheels that Swing Up and Down—FIGS. 4 & 9

An alternative to using T-brackets 43 on the end of stabilizing rails 59 is to attach swing brackets 46 to the end of stabilizing rails 59 and pin with pins 60. Couple the ends of wheel posts 55 opposite of the boat wheels 56 with a pin 60, or with bolt 58 and nut 57, in the middle hole of swing bracket 46 allowing each boat wheel assembly 54 to rotate up or down in the open end of the swing bracket 46, then insert a pin 60 in one of the concentrically arranged holes on the edge of the swing bracket 46 so it goes through the hole in the wheel post and secures it in a selectively oriented position.

Operation—Attaching Wheels to Boat Seat Frame—FIGS. 1 & 10

Wheels may be easily placed on the boat seat frame 38 by removing the pins (not shown) connecting the boat seat frame 38 to the boat frame main tubes 34 and separating from each other. Slide two cross brackets 44, one each onto the end of one of the fore or aft boat seat frame 38 and position each over the existing pin holes and recouple the boat frame main tubes 34 with the boat seat frame 38 using pins 60. Then selectively position the boat wheel assemblies 54 in the cross brackets and secure with pins 60.

Operation—Installing Outrigger Wheels on Boat Frame Main Tubes—FIGS. 1 & 11

Wheels may be alternatively attached to the boat frame main tubes 34 and set outside of pontoons 32 for a very wide and stable placement of the wheels, by: first removing the pins (not shown) that hold gear rack main tubes 36 to boat frame main tubes 34 and separate gear rack 35 from the watercraft; second, slide two cross brackets 44 onto the ends of the boat frame main tubes 34 and align the holes of the cross brackets 44 with the existing holes in the boat frame main tube; third, insert gear rack main tubes 36 back into boat frame main tubes 34 until holes are aligned and pin with pins 60, connecting all three of the gear rack main tube 36 inside the boat frame main tube 34 and cross bracket 44 together; fourth, slide outrigger rail 62 through the two cross brackets 44 and pin with pins 60; fifth, couple selectively oriented T-brackets 43 (or, alternatively, adapted swing bracket with side fittings) with pins 60 on each end of the outrigger rail 62; sixth, insert boat wheel assemblies 54 into T-brackets 43 for movement over land with wheels.

Operation—Attaching to A Bicycle for Towing—FIGS. 1, 12, 13 & 14

A small pontoon watercraft with wheels previously attached in suitable configuration can be easily fitted for towing with a bicycle by: first, sliding three cross brackets 44 onto cross rail 63 in the same orientation, and pin one on each end and one in the middle using pins 60 in the provided holes; second, remove the pins (not shown) and separate foot rest tubes 31 from boat frame main tubes 34; third, insert the foot rest tubes 31 through the two cross brackets 44 previously attached to the ends of cross rail 63, and secure in place with pins 60; fourth, return the foot rest tubes 31 with the attached cross rail 63 into the boat frame main tubes and reinstall the original pins (not shown); fifth, insert one end of seatpost tow bar 64 into the opening in the center cross bracket 44 previously installed on cross rail 63 and secure with pin 60 so it is able to rotate freely in cross bracket 44; sixth, remove bicycle seat 66 with attached seatpost 67 of bicycle 65, and slide seatpost bracket 45 over seatpost 67 and reinstall on bicycle 65; seventh, connect seatpost tow bar 64 to seatpost bracket 45 with pin 60.

Similarly, a rear axle tow bar 69 can be connected to a bracket (not shown) coupled at the rear bicycle axle 70, instead of a seatpost tow bar 64 and seatpost bracket 45.

Operation—Attaching A Bike Rack to Make Amphibious—FIGS. 15 & 16

In addition to the previously added wheels and bicycle towing accessories, a bike rack 71 can be installed simply by adding a bike rack mounting rail 74 spanning between the two previously installed spaced apart T-brackets 43, having two cross brackets 44 mounted to the bike rack mounting rail 74, oriented with their openings vertically aligned, to accept bike rack main tube legs 72, and pin in place with pins 60. Bike 65 will then sit on the independently positionable bike rack arms 73 of bike rack 71.

Similarly, cross brackets 44 can be added directly to the outrigger rail 62 for mounting the bike rack 71, to the outrigger rail instead of the bracket and rails mounted needed to mount to the gear rack 35.

Operation—Attaching Other Accessories—FIGS. 17, 18 & 19

In addition to many of the combinations already described, an accessory bracket 47 can be installed on cross rail 63, in place of the middle cross bracket 44 previously installed, and a variety of accessories can be mounted, such as a trolling motor 75 or a human powered pedal drive 77, just to name a few.

Operation—Welded Brackets—FIG. 3

Slightly alternative embodiments can be achieved by adapting the previously listed slip-on brackets to be welded to watercraft frame members, instead of pinned or bolted, as well as using simple square receiver tube 51, round receiver tube 52 and channel bracket 53 welded directly to a frame member or in combination with slip-on brackets or welded to rails.

CONCLUSION, RAMIFICATIONS AND SCOPE

Thus the reader will see that at least one embodiment of the system of brackets and rails for attaching wheels, towing, and accessory devices will increase the transportability and utility of small pontoon watercraft by making it towable by pedestrian and bicycle, converting it to amphibious operation, and allowing a variety of new capabilities, such as a front mounted trolling motor and a human powered pedal drive, among others.

While the above description contains many specifics, these should not be construed as limitations on the scope, but rather as an exemplification of one or more embodiments thereof. Many other variations of size, material, shape, and configurations are possible. For example, a variety of suitable structural materials could be employed, such as steel, aluminum, plastic, wood, composites, carbon fiber, or some combination thereof; and parts could be produced as one component, such as a cast or injection molded plastic part, or cast aluminum part, or could be formed by multiple components together by welding, gluing, bolting together, or some other form of bonding. Brackets can be made to slip-on or be welded on, and can be produced to fit virtually any size of tube. And brackets and attachments can be coupled in place with a variety of pins, spring clips, bolts, compression fittings, or other clamping devices. And the locations for placement of brackets and their orientation are numerous.

Thus the scope of the embodiments should be determined by the appended claims and their legal equivalents, rather than by the examples given.

I claim:

1. A system of brackets and rails for attaching devices to a small pontoon watercraft having an interconnecting boat frame structure with multiple transverse and longitudinally oriented frame members spanning spaced apart pontoons, the system comprising in combination:
   at least one pair of cross brackets and means for coupling at least one each to a boat frame main tube on opposite sides of said pontoon watercraft, wherein a hollow internal opening of said cross brackets are oriented in a horizontal plane orthogonally aligned to said boat frame main tube,
   at least one outrigger rail, having a first and second end, spanning through said cross brackets with means for coupling thereto, whereby said outrigger rail provides a non-twisting connection member for mounting a variety of other devices to said pontoon watercraft,
   at least two T-brackets or swing brackets and means for coupling one each to a said first and said second end of said outrigger rail in a selected orientation,
   at least two boat wheel assemblies and means for coupling to said T-brackets or said swing brackets, whereby said pontoon watercraft is able to be wheeled over land.

2. The system of claim 1, further comprising:
   a bicycle,
   a bike rack means, whereby said pontoon watercraft is able to carry said bicycle over water.

3. The system of claim 1, further comprising:
   a bicycle,
   a bike rack means, and
   a bicycle towing means, whereby said pontoon watercraft is able to be towed over land by said bicycle.

4. The system of claim 1, further comprising:
   a bicycle,
   a bike rack means,
   a bicycle towing means, and
   an accessory attachment means, whereby a variety of other devices and accessories are able to be connected to said pontoon watercraft.

\* \* \* \* \*